(12) United States Patent
Liu et al.

(10) Patent No.: US 12,008,825 B2
(45) Date of Patent: Jun. 11, 2024

(54) CLASSIFICATION WORKFLOW FOR FLEXIBLE IMAGE BASED PARTICLE SORTING

(71) Applicants: SONY GROUP CORPORATION, Tokyo (JP); Sony Corporation of America, New York, NY (US)

(72) Inventors: Ming-Chang Liu, San Jose, CA (US); Michael Zordan, Boulder Creek, CA (US); Ko-Kai Albert Huang, Cupertino, CA (US); Su-Hui Chiang, San Jose, CA (US); Liyu Gong, Lexington, KY (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 214 days.

(21) Appl. No.: 17/531,124

(22) Filed: Nov. 19, 2021

(65) Prior Publication Data

US 2022/0156482 A1    May 19, 2022

Related U.S. Application Data

(60) Provisional application No. 63/116,090, filed on Nov. 19, 2020.

(51) Int. Cl.
*G06V 20/69*     (2022.01)
*G06F 18/214*    (2023.01)
(Continued)

(52) U.S. Cl.
CPC ......... *G06V 20/698* (2022.01); *G06F 18/214* (2023.01); *G06F 18/23* (2023.01); *G06F 18/2411* (2023.01)

(58) Field of Classification Search
CPC . G06V 20/698; G06F 18/2411; G06F 18/214; G06F 18/23
See application file for complete search history.

(56) References Cited

U.S. PATENT DOCUMENTS

2020/0126639 A1    4/2020  Lin et al.
2021/0089751 A1*   3/2021  Herbig .................. G01N 21/85
(Continued)

FOREIGN PATENT DOCUMENTS

JP    2016519758 A    7/2016
JP    2019529882 A    10/2019
(Continued)

*Primary Examiner* — David Perlman
(74) *Attorney, Agent, or Firm* — HAVERSTOCK & OWENS, A LAW CORPORATION

(57) ABSTRACT

An image-based classification workflow uses unsupervised clustering to help a user identify subpopulations of interest for sorting. Labeled cell images are used to fine-tune the supervised classification network for a specific experiment. The workflow allows the user to select the populations to sort in the same manner for a variety of applications. The supervised classification network is very fast, allowing it to make real-time sort decisions as the cell travels through a device. The workflow is more automated and has fewer user steps, which improves the ease of use. The workflow uses machine learning to avoid human error and bias from manual gating. The workflow does not require the user to be an expert in image processing, thus increasing the ease of use.

21 Claims, 6 Drawing Sheets

(51) Int. Cl.
*G06F 18/23* (2023.01)
*G06F 18/2411* (2023.01)

(56) References Cited

U.S. PATENT DOCUMENTS

2021/0216746 A1* 7/2021 Nie .................... G06V 10/764
2022/0064594 A1* 3/2022 Harrington ........ G01N 15/1459

FOREIGN PATENT DOCUMENTS

| WO | 2019/0170993 A1 | 9/2019 |
| WO | WO-2020081343 A1 | 4/2020 |
| WO | 2020/101023 A1 | 5/2020 |

* cited by examiner

CLASSIFICATION WORKFLOW FOR FLEXIBLE IMAGE BASED PARTICLE SORTING

CROSS-REFERENCE TO RELATED APPLICATION(S)

This application claims priority under 35 U.S.C. § 119(e) of the U.S. Provisional Patent Application Ser. No. 63/116,090, filed Nov. 19, 2020 and titled, "CLASSIFICATION WORKFLOW FOR FLEXIBLE IMAGE BASED PARTICLE SORTING," which is hereby incorporated by reference in its entirety for all purposes.

FIELD OF THE INVENTION

The present invention relates to cell sorting. More specifically, the present invention relates to image based cell sorting.

BACKGROUND OF THE INVENTION

Traditional fluorescence activated cell sorting relies on labeling cells with fluorescent markers and has very limited morphological information of cells. However, some applications require morphological information of cells to accurately sort the cells, while some applications are not suitable to use fluorescent markers. In addition, traditional fluorescence activated cell sorting uses manual gating to establish sorting criteria based on fluorescent markers. However, manual gating is time consuming and may be biased.

There are many biological applications that would benefit from cell sorting, but are not possible on current flow cytometry-based cell sorters because they do not perform imaging to identify the cells of interest.

There is an existing approach that uses conventional image processing and feature extraction to make sort decisions from cell images, and there is also an approach where a deep learning network has been used to make the real-time sort classification. The conventional image analysis approach has the drawback that it requires the user to know how to perform quantitative image analysis and that is a skill that most cell sorting users do not possess. The published deep learning approach is limited because it requires offline identification of cell images to be used to train the convolutional network. This is a manual process that is labor intensive, and training the deep learning network for a particular application can take several hours to days, so it does not provide a flexible solution for different applications.

SUMMARY OF THE INVENTION

An image-based classification workflow uses unsupervised clustering to help a user identify subpopulations of interest for sorting. Labeled cell images are used to fine-tune the supervised classification network for a specific experiment. The workflow allows the user to select the populations to sort in the same manner for a variety of applications. The supervised classification network is very fast, allowing it to make real-time sort decisions as the cell travels through a device. The workflow is more automated and has fewer user steps, which improves the ease of use. The workflow uses machine learning to avoid human error and bias from manual gating. The workflow does not require the user to be an expert in image processing, thus increasing the ease of use.

In one aspect, a method comprises pre-training a feature encoder using cell images, performing unsupervised clustering to identify populations, wherein the unsupervised clustering receives output from pre-training the feature encoder, implementing a classifier to fine-tune supervised classification and performing real-time classification of cells during active sorting using the classifier. The feature encoder detects and measures feature values from the cell images. The feature encoder is implemented using a neural network. The feature encoder is scalable to accommodate 1 to 12 image channels. Performing the unsupervised clustering includes classifying cells of the cell images into clusters. The method further comprises manually or automatically determining which population of cells to sort based on results of the unsupervised clustering. A user labels the clusters after the unsupervised clustering based on viewing the cluster and representative information, wherein clusters are labeled as "sort" or "do not sort." Classifier results from the unsupervised clustering are used by the classifier to fine-tune a convolutional neural network. The classifier is configured to be re-trained for each experiment.

In another aspect, an apparatus comprises a non-transitory memory for storing an application, the application for: pre-training a feature encoder using cell images, performing unsupervised clustering to identify populations, wherein the unsupervised clustering receives output from pre-training the feature encoder, implementing a classifier to fine-tune supervised classification and performing real-time classification of cells during active sorting using the classifier and a processor coupled to the memory, the processor configured for processing the application. The feature encoder detects and measures feature values from the cell images. The feature encoder is implemented using a neural network. The feature encoder is scalable to accommodate 1 to 12 image channels. Performing the unsupervised clustering includes classifying cells of the cell images into clusters. The apparatus is further configured for automatically determining which population of cells to sort based on results of the unsupervised clustering. A user labels the clusters after the unsupervised clustering based on viewing the cluster and representative information, wherein clusters are labeled as "sort" or "do not sort." Classifier results from the unsupervised clustering are used by the classifier to fine-tune a convolutional neural network. The classifier is configured to be re-trained for each experiment.

In another aspect, a system comprises a first device configured for acquiring cell images and a second device configured for: pre-training a feature encoder using the cell images, performing unsupervised clustering to identify populations, wherein the unsupervised clustering receives output from pre-training the feature encoder, implementing a classifier to fine-tune supervised classification and performing real-time classification of cells during active sorting using the classifier. The feature encoder detects and measures feature values from the cell images. The feature encoder is implemented using a neural network. The feature encoder is scalable to accommodate 1 to 12 image channels. Performing the unsupervised clustering includes classifying cells of the cell images into clusters. The system further comprises manually or automatically determining which population of cells to sort based on results of the unsupervised clustering. A user labels the clusters after the unsupervised clustering based on viewing the cluster and representative information, wherein clusters are labeled as "sort" or "do not sort." Classifier results from the unsupervised clustering are used by the classifier to fine-tune a convolutional neural network. The classifier is configured to be re-trained for each experiment.

DETAILED DESCRIPTION OF THE PREFERRED EMBODIMENT

The image-based classification workflow identifies subpopulations present in a sample, allows a user to choose which subpopulation(s) to be purified, and then fine-tunes a supervised classification system that will make real-time sort decisions.

The classification workflow is a solution that allows for a flexible image-based cell classification system that accommodates a wide variety of biological applications. The use of unsupervised clustering to label cell images to fine-tune an efficient supervised classification network to make real-time sort decisions is a novel idea which enables improved ease of use for an image-based cell sorter.

The classification workflow addresses unmet needs of flow cytometry-based cell sorting customers: it allows for cell sorting applications that require imaging which cannot be performed on traditional fluorescence activated cell sorting and it allows the sort classification to be optimized for a wide variety of applications.

The optimized supervised classification network is able to perform real-time image classification that makes sorting cells based on images possible. This allows for applications that are typically performed using microscopy or high-content imaging (neither of which have sorting capabilities) to be used on a cell sorter.

There is wide variation of the potential image-based cell sorting applications. The workflow uses unsupervised clustering to identify the subpopulations present in the sample, and then the user can pick the cluster or clusters that contain their cells of interest. The supervised classification system is then fine tuned to identify the specific cells of interest that the user would like to sort.

An implementation of the classification workflow includes performing unsupervised clustering utilizing a pre-trained feature encoder that will identify common features of cell images. The resulting clusters represent the subpopulations that are present in the sample, and the user then picks the clusters that contain their cells of interest, and the cells in those clusters are labeled. The labeled cell images are then used for supervised fine-tuning of the optimized classifier that is used for real-time cell sorting.

The classification workflow is able to be used in an Image Activated Cell Sorter (IACS).

Figure 1:
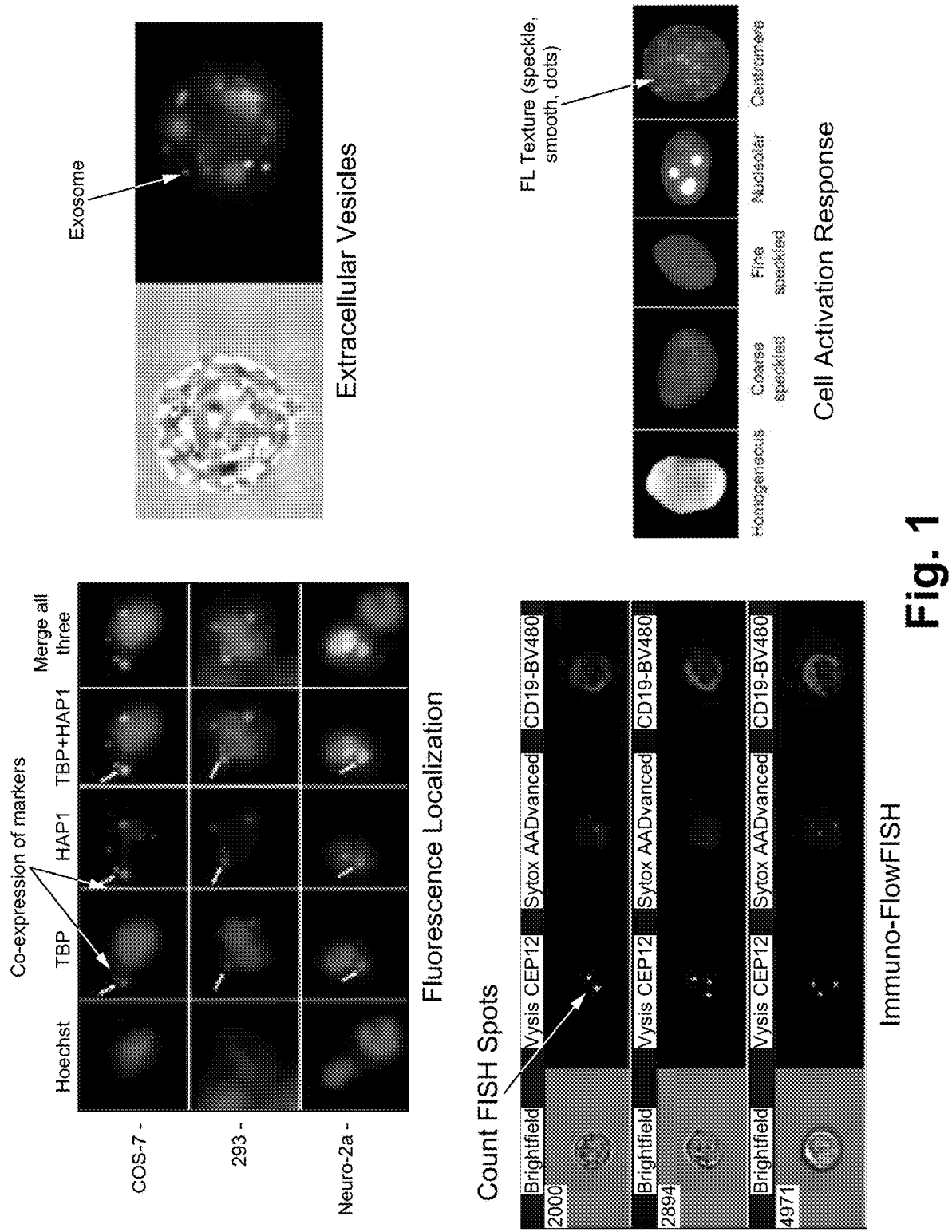
FIG. 1 illustrates examples of applications of an Image Activated Cell Sorter (IACS) according to some embodiments.

FIG. 1 illustrates examples of applications of an IACS according to some embodiments. IACS is able to be used in fluorescence localization (e.g., co-expression of markers), immuno-flowFISH (e.g., counting FISH spots), extracellular vesicles (e.g., exosome), and cell activation response (e.g., FL texture (speckle, smooth, dots)). The immuno-flowFISH application is not possible with traditional cytometry since the separate spots may not be detected/distinguished. However, the application of distinguishing and detecting the separate spots is possible using IACS. In another example, for fluorescence localization, the IACS is able to detect the specific locations of the different signals (e.g., red versus green), whereas traditional cytometry would merely be able to provide the intensity of each signal, but not where the signals occur within the cell.

Figure 2:
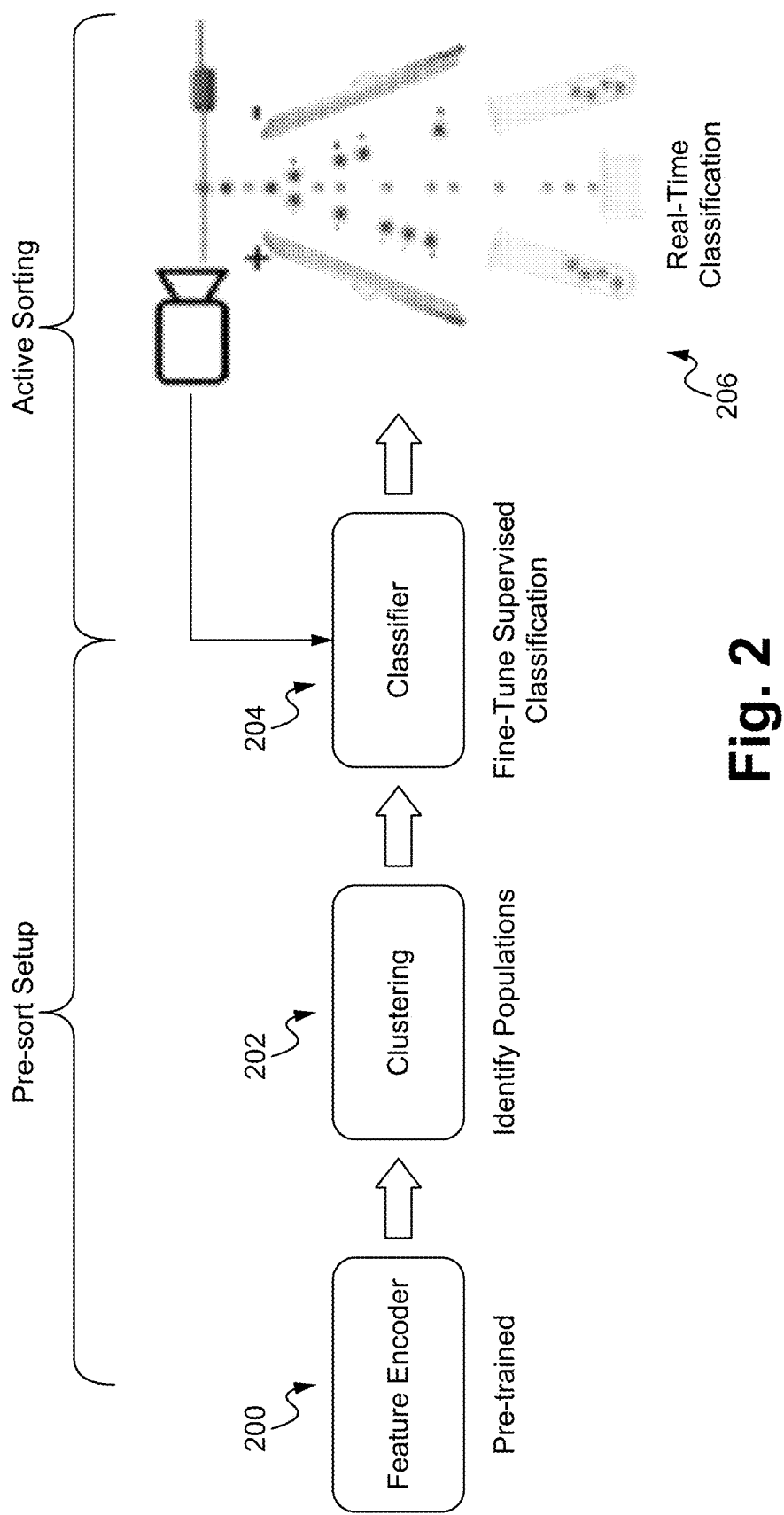
FIG. 2 illustrates a flowchart of a classification workflow according to some embodiments.

FIG. 2 illustrates a flowchart of a classification workflow according to some embodiments. The image-based or IACS classification workflow includes steps such as a pre-sort setup and active sorting which include separate elements/steps. The pre-sort setup allows for the identification of the cells to sort and subsequent fine-tuning of the supervised classification network. The active sorting portion uses the optimized and fine-tuned supervised classification network to make real-time sort decisions as the cell flows through the device.

In the step 200, a feature encoder is pre-trained. A specified number of cells from an experiment are run through the system. The feature encoder is able to indicate to the user what is in a sample. As a cell goes through the feature encoder, the feature encoder detects/measures feature values from the image, and the output of the feature encoder goes to the unsupervised clustering. The feature encoder is scalable to accommodate 1-12 image channels (e.g., bright field and multiple fluorescence channels). Any number or range of image channels are able to be utilized. An example of a feature encoder is described in U.S. patent application Ser. No. 17/222,131, filed on Apr. 5, 2021, titled, "A FRAMEWORK FOR IMAGE BASED UNSUPERVISED CELL CLUSTERING AND SORTING," which is hereby incorporated by reference in its entirety for all purposes.

In the step 202, unsupervised clustering is utilized to identify populations (e.g., group similar cells together). The unsupervised clustering uses the output of the feature encoder to group/classify the cells into clusters. The grouping of the cells is able to be performed in any manner (e.g., based on detected features, size, and/or any other characteristic). A user is able to look at the results of the unsupervised clustering to determine which population of cells to sort. The user is able to view representative image sets of single events and/or extracted feature values of the clusters (e.g., fluorescence intensity or other feature values). The user is able to label the clusters (e.g., after the unsupervised clustering) based on viewing the cluster and representative information. The user is able to label the clusters as "sort" or "do not sort," for example. Multiple "sort" clusters are possible. In some embodiments, the labeling process is automated using machine learning, neural networks and artificial intelligence.

In the step 204, a classifier is implemented to fine-tune supervised classification. The classifier results/labeling from the unsupervised clustering are able to be used by the classifier, such as to fine-tune a shallow or convolutional neural network. The classifier is able to be re-trained for each experiment.

In the step 206, real-time classification is performed during active sorting. The trained classifier is used to do the real-time classification based on the sorting classifications. Unlike traditional cell sorters which have one channel detector that measure the intensity of a signal, the classification workflow utilizes a whole image (e.g., 50 pixels×50 pixels) for processing. In some embodiments, fewer or additional steps are implemented. In some embodiments, the order of the steps is modified.

Figure 3:
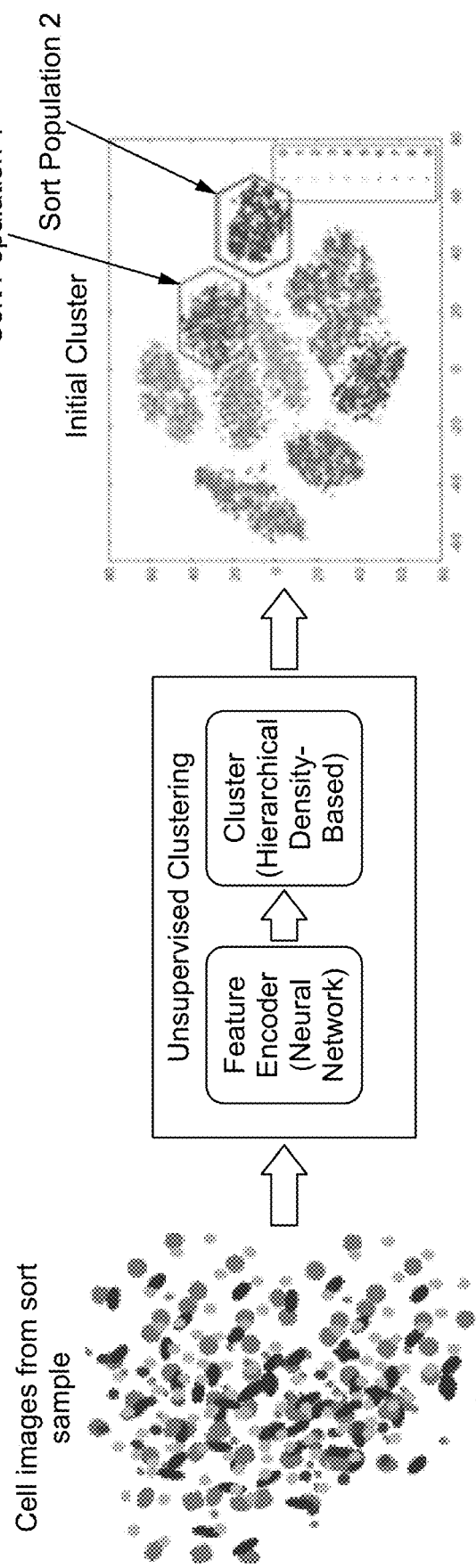
FIG. 3 illustrates a flowchart of a feature encoder and unsupervised clustering according to some embodiments.

FIG. 3 illustrates a flowchart of a feature encoder and unsupervised clustering according to some embodiments. In the step 300, cell images from a sort sample are acquired. An aliquot of the sample to sort is run on the IACS to capture the cell images. The cell images are the input to a neural network-based feature encoder. In the step 302, a feature encoder (e.g., neural network) is implemented. In some embodiments, the feature encoder is pre-trained (e.g., offline) to detect general features in Brightfield and Fluorescence images by a large dataset of cell images. In the step 304, unsupervised clustering is performed (e.g., hierarchical density-based). The resulting clusters of cells represent different subpopulations of cells present in the sample. In the step 306, the user looks at the clusters (e.g., representative images, measured image features) to determine which clusters contain the cells of interest. The benefit of this approach is that it allows the user to identify and select the population(s) to sort (and to not sort) regardless of the application type and specific fluorescence staining panel used in the experiment. The clusters are similar to truth sets which are able to be used to train supervised classification. The labeled images from the clustering are used to train (or re-train) the supervised classification network. Once the supervised classification network is trained and is optimized for accuracy and speed, then the network is ready to be used for live sorting (e.g., cell coming through the system). In live sorting, an image is taken of a cell, and the supervised classification determines if the cell is a cell to sort to do the real-time classification to physically sort the cells, and a purifier isolates the cells of interest.

Figure 4:
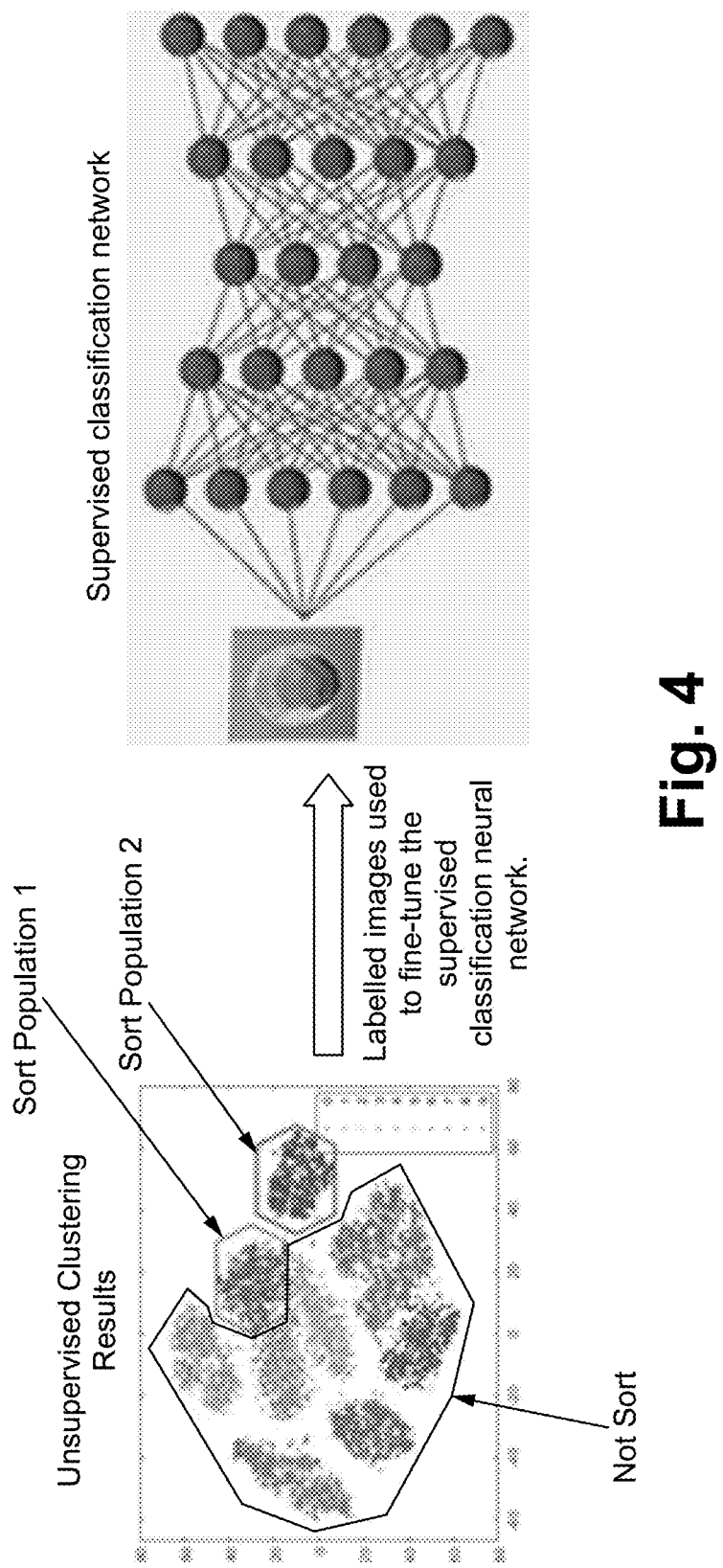
FIG. 4 illustrates a diagram of using labeled images to fine-tune supervised classification according to some embodiments.

FIG. 4 illustrates a diagram of using labeled images to fine-tune supervised classification according to some embodiments. The labeled images 400 are used to fine-tune the supervised classification neural network 402 for a specific experiment. In some embodiments, the supervised classification neural network 402 is the same as or a part of the trained classifier 204. In order to make the sort decision fast enough for real-time with the desired accuracy, a high-speed classification network is used.

Figure 5:
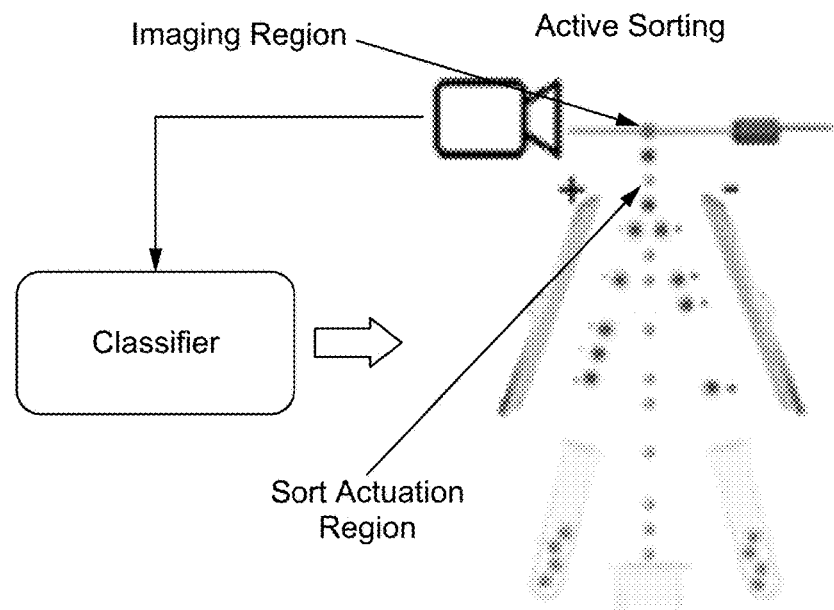
FIG. 5 illustrates a diagram of using supervised classification for real-time image classification according to some embodiments.

FIG. 5 illustrates a diagram of using supervised classification for real-time image classification according to some embodiments. The trained classifier 204 is used to make real-time sort decisions for active sorting 206. The remaining sort sample is run on the instrument (where the cells arrive one at a time). Multiple image channels are able to be acquired for each cell. The trained classifier 204 classifies each event to one of the sort populations or not to be sorted based on the images. The sort decisions are made in the time it takes the cell to travel from the imaging region to the sort actuation region (e.g., in less than 500 microseconds).

An experiment is able to be one image per cell or multiple images per cell (e.g., four image channels for one cell that are used together). The system is able to be scaled depending on the implementation (e.g., depending on how many active image channels are being used). There may be a different architecture used for different numbers of image channels, so instances are trained for all possible numbers of image channels, and the corresponding optimized architecture is selected based on the active image channels for each experiment. The workflow is able to accept any type of input for any application such that the user does not write different rules for different experiments.

Figure 6:
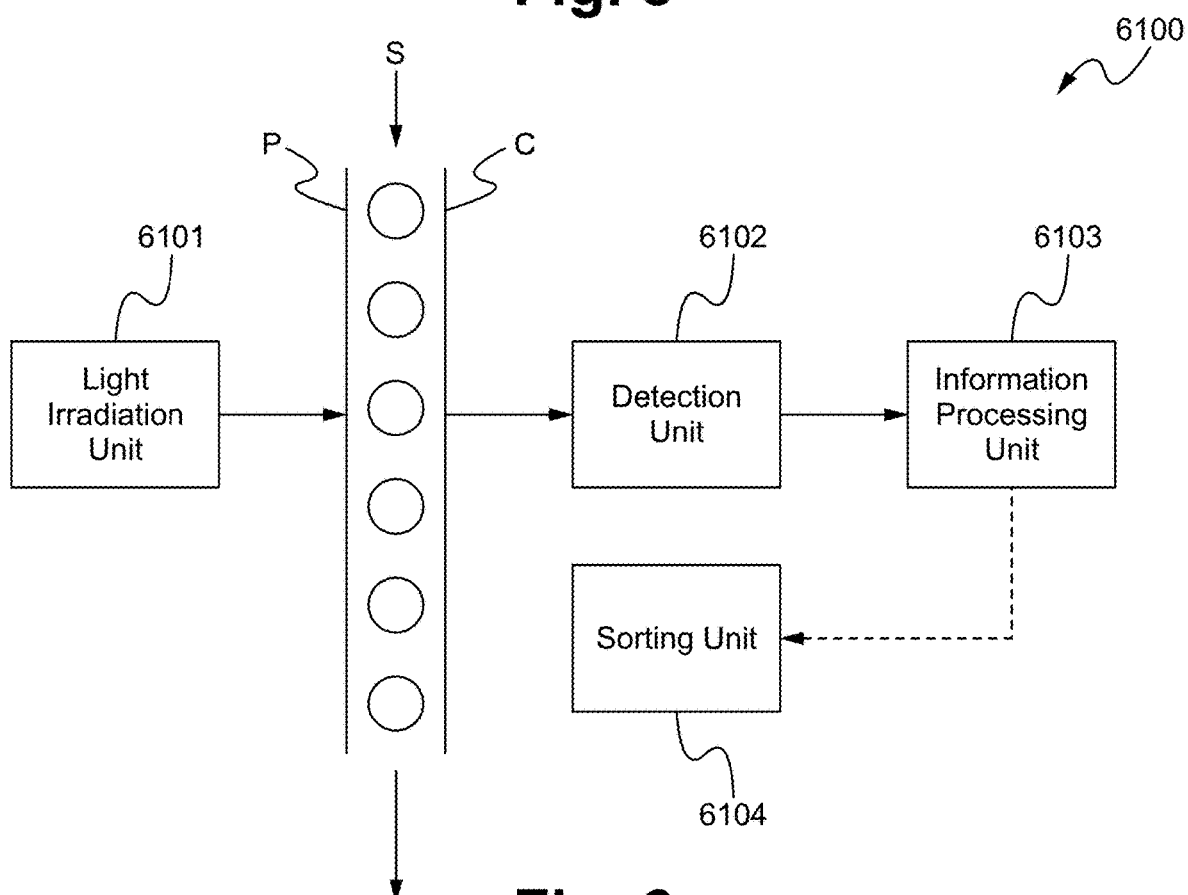
FIG. 6 illustrates a diagram schematically showing the overall configuration of a biological sample analyzer according to some embodiments.

FIG. 6 illustrates a diagram schematically showing the overall configuration of a biological sample analyzer according to some embodiments.

FIG. 6 shows an example configuration of a biological sample analyzer of the present disclosure. A biological sample analyzer 6100 shown in FIG. 6 includes: a light irradiation unit 6101 that irradiates a biological sample S flowing in a flow channel C with light; a detection unit 6102 that detects light generated by irradiating the biological sample S; and an information processing unit 6103 that processes information about the light detected by the detection unit. The biological sample analyzer 6100 is a flow cytometer or an imaging cytometer, for example. The biological sample analyzer 6100 may include a sorting unit 6104 that sorts out specific biological particles P in a biological sample. The biological sample analyzer 6100 including the sorting unit is a cell sorter, for example.

(Biological Sample)

The biological sample S may be a liquid sample containing biological particles. The biological particles are cells or non-cellular biological particles, for example. The cells may be living cells, and more specific examples thereof include blood cells such as erythrocytes and leukocytes, and germ cells such as sperms and fertilized eggs. Also, the cells may be those directly collected from a sample such as whole blood, or may be cultured cells obtained after culturing. The non-cellular biological particles are extracellular vesicles, or particularly, exosomes and microvesicles, for example. The biological particles may be labeled with one or more labeling substances (such as a dye (particularly, a fluorescent dye) and a fluorochrome-labeled antibody). Note that particles other than biological particles may be analyzed by the biological sample analyzer of the present disclosure, and beads or the like may be analyzed for calibration or the like.

(Flow Channel)

The flow channel C is designed so that a flow of the biological sample S is formed. In particular, the flow channel C may be designed so that a flow in which the biological particles contained in the biological sample are aligned substantially in one row is formed. The flow channel structure including the flow channel C may be designed so that a laminar flow is formed. In particular, the flow channel structure is designed so that a laminar flow in which the flow of the biological sample (a sample flow) is surrounded by the flow of a sheath liquid is formed. The design of the flow channel structure may be appropriately selected by a person skilled in the art, or a known one may be adopted. The flow channel C may be formed in a flow channel structure such as a microchip (a chip having a flow channel on the order of micrometers) or a flow cell. The width of the flow channel C is 1 mm or smaller, or particularly, may be not smaller than 10 µm and not greater than 1 mm. The flow channel C and the flow channel structure including the flow channel C may be made of a material such as plastic or glass.

The biological sample analyzer of the present disclosure is designed so that the biological sample flowing in the flow channel C, or particularly, the biological particles in the biological sample are irradiated with light from the light irradiation unit 6101. The biological sample analyzer of the present disclosure may be designed so that the irradiation point of light on the biological sample is located in the flow channel structure in which the flow channel C is formed, or may be designed so that the irradiation point is located outside the flow channel structure. An example of the former case may be a configuration in which the light is emitted onto the flow channel C in a microchip or a flow cell. In the latter case, the biological particles after exiting the flow channel structure (particularly, the nozzle portion thereof) may be irradiated with the light, and a flow cytometer of a jet-in-air type can be adopted, for example.

(Light Irradiation Unit)

The light irradiation unit 6101 includes a light source unit that emits light, and a light guide optical system that guides the light to the irradiation point. The light source unit includes one or more light sources. The type of the light source(s) is a laser light source or an LED, for example. The wavelength of light to be emitted from each light source may be any wavelength of ultraviolet light, visible light, and infrared light. The light guide optical system includes optical components such as beam splitters, mirrors, or optical fibers, for example. The light guide optical system may also include a lens group for condensing light, and includes an objective lens, for example. There may be one or more irradiation points at which the biological sample and light intersect. The light irradiation unit 6101 may be designed to collect light emitted onto one irradiation point from one light source or different light sources.

(Detection Unit)

The detection unit 6102 includes at least one photodetector that detects light generated by emitting light onto biological particles. The light to be detected may be fluorescence or scattered light (such as one or more of the following: forward scattered light, backscattered light, and side scattered light), for example. Each photodetector includes one or more light receiving elements, and has a light receiving element array, for example. Each photodetector may include one or more photomultiplier tubes (PMTs) and/or photodiodes such as APDs and MPPCs, as the light receiving elements. The photodetector includes a PMT array in which a plurality of PMTs is arranged in a one-dimensional direction, for example. The detection unit 6102 may also include an image sensor such as a CCD or a CMOS. With the image sensor, the detection unit 6102 can acquire an image (such as a bright-field image, a dark-field image, or a fluorescent image, for example) of biological particles.

The detection unit 6102 includes a detection optical system that causes light of a predetermined detection wavelength to reach the corresponding photodetector. The detection optical system includes a spectroscopic unit such as a prism or a diffraction grating, or a wavelength separation unit such as a dichroic mirror or an optical filter. The detection optical system is designed to disperse the light generated by light irradiation to biological particles, for example, and detect the dispersed light with a larger number of photodetectors than the number of fluorescent dyes with which the biological particles are labeled. A flow cytometer including such a detection optical system is called a spectral flow cytometer. Further, the detection optical system is designed to separate the light corresponding to the fluorescence wavelength band of a specific fluorescent dye from the light generated by the light irradiation to the biological particles, for example, and cause the corresponding photodetector to detect the separated light.

The detection unit 6102 may also include a signal processing unit that converts an electrical signal obtained by a photodetector into a digital signal. The signal processing unit may include an A/D converter as a device that performs the conversion. The digital signal obtained by the conversion performed by the signal processing unit can be transmitted to the information processing unit 6103. The digital signal can be handled as data related to light (hereinafter, also referred to as "light data") by the information processing unit 6103. The light data may be light data including fluorescence data, for example. More specifically, the light data may be data of light intensity, and the light intensity may be light intensity data of light including fluorescence (the light intensity data may include feature quantities such as area, height, and width).

(Information Processing Unit)

The information processing unit 6103 includes a processing unit that performs processing of various kinds of data (light data, for example), and a storage unit that stores various kinds of data, for example. In a case where the processing unit acquires the light data corresponding to a fluorescent dye from the detection unit 6102, the processing unit can perform fluorescence leakage correction (a compensation process) on the light intensity data. In the case of a spectral flow cytometer, the processing unit also performs a fluorescence separation process on the light data, and acquires the light intensity data corresponding to the fluorescent dye. The fluorescence separation process may be performed by an unmixing method disclosed in JP 2011-232259 A, for example. In a case where the detection unit 6102 includes an image sensor, the processing unit may acquire morphological information about the biological particles, on the basis of an image acquired by the image sensor. The storage unit may be designed to be capable of storing the acquired light data. The storage unit may be designed to be capable of further storing spectral reference data to be used in the unmixing process.

In a case where the biological sample analyzer 6100 includes the sorting unit 6104 described later, the information processing unit 6103 can determine whether to sort the biological particles, on the basis of the light data and/or the morphological information. The information processing unit 6103 then controls the sorting unit 6104 on the basis of the result of the determination, and the biological particles can be sorted by the sorting unit 6104.

The information processing unit 6103 may be designed to be capable of outputting various kinds of data (such as light data and images, for example). For example, the information processing unit 6103 can output various kinds of data (such as a two-dimensional plot or a spectrum plot, for example) generated on the basis of the light data. The information processing unit 6103 may also be designed to be capable of accepting inputs of various kinds of data, and accepts a gating process on a plot by a user, for example. The information processing unit 6103 may include an output unit (such as a display, for example) or an input unit (such as a keyboard, for example) for performing the output or the input.

The information processing unit 6103 may be designed as a general-purpose computer, and may be designed as an information processing device that includes a CPU, a RAM, and a ROM, for example. The information processing unit 6103 may be included in the housing in which the light irradiation unit 6101 and the detection unit 6102 are included, or may be located outside the housing. Further, the various processes or functions to be executed by the information processing unit 6103 may be realized by a server computer or a cloud connected via a network.

(Sorting Unit)

The sorting unit 6104 performs sorting of biological particles, in accordance with the result of determination performed by the information processing unit 6103. The sorting method may be a method by which droplets containing biological particles are generated by vibration, electric charges are applied to the droplets to be sorted, and the traveling direction of the droplets is controlled by an electrode. The sorting method may be a method for sorting by controlling the traveling direction of biological particles in the flow channel structure. The flow channel structure has a control mechanism based on pressure (injection or suction) or electric charge, for example. An example of the flow channel structure may be a chip (the chip disclosed in JP 2020-76736 A, for example) that has a flow channel structure in which the flow channel C branches into a recovery flow channel and a waste liquid flow channel on the downstream side, and specific biological particles are collected in the recovery flow channel.

Figure 7:
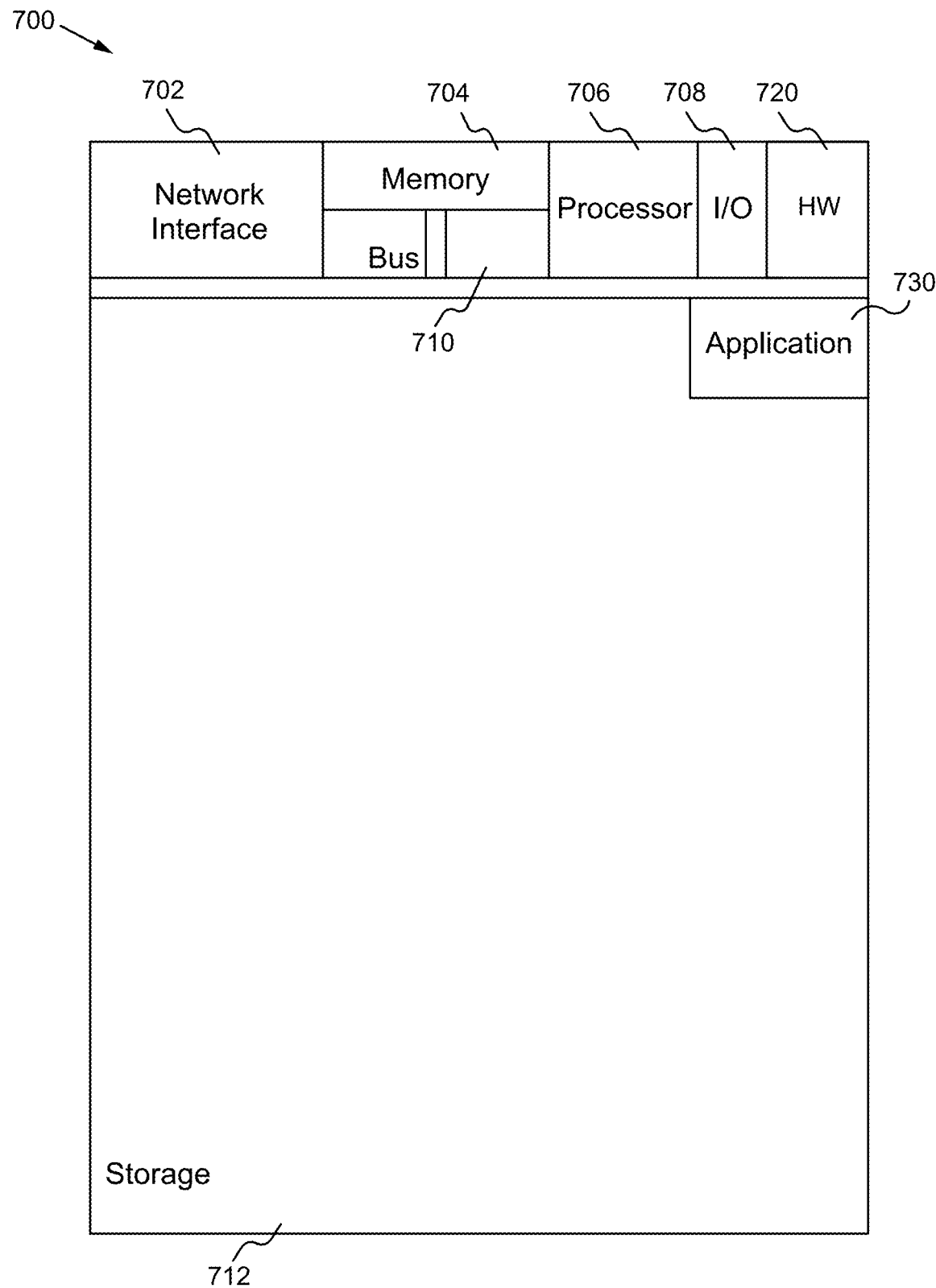
FIG. 7 shows a block diagram of an exemplary computing device configured to implement the classification workflow according to some embodiments.

FIG. 7 shows a block diagram of an exemplary computing device configured to implement the classification workflow according to some embodiments. The computing device 700 is able to be used to acquire, store, compute, process, communicate and/or display information such as images and videos. The computing device 700 is able to implement any of the classification workflow aspects. In general, a hardware structure suitable for implementing the computing device 700 includes a network interface 702, a memory 704, a processor 706, I/O device(s) 708, a bus 710 and a storage device 712. The choice of processor is not critical as long as a suitable processor with sufficient speed is chosen. The memory 704 is able to be any conventional computer memory known in the art. The storage device 712 is able to include a hard drive, CDROM, CDRW, DVD, DVDRW, High Definition disc/drive, ultra-HD drive, flash memory card or any other storage device. The computing device 700 is able to include one or more network interfaces 702. An example of a network interface includes a network card connected to an Ethernet or other type of LAN. The I/O device(s) 708 are able to include one or more of the following: keyboard, mouse, monitor, screen, printer, modem, touchscreen, button interface and other devices. Classification workflow application(s) 730 used to implement the classification workflow are likely to be stored in the storage device 712 and memory 704 and processed as applications are typically processed. More or fewer components shown in FIG. 7 are able to be included in the computing device 700. In some embodiments, classification workflow hardware 720 is included. Although the computing device 700 in FIG. 7 includes applications 730 and hardware 720 for the classification workflow, the classification workflow is able to be implemented on a computing device in hardware, firmware, software or any combination thereof. For example, in some embodiments, the classification workflow applications 730 are programmed in a memory and executed using a processor. In another example, in some embodiments, the classification workflow hardware 720 is programmed hardware logic including gates specifically designed to implement the classification workflow.

In some embodiments, the classification workflow application(s) 730 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the classification workflow described herein, devices such as a microscope with a camera are used to acquire content, and a device is able to process the acquired content. The classification workflow is able to be implemented with user assistance or automatically without user involvement.

In operation, the classification workflow is used in an IACS. The workflow can also be used in a spectral cell sorter or other conventional cell sorters. The advantage of the classification workflow that combines unsupervised clustering and supervised classification is that it reduces bias and human error that can occur using the current method of manual sequential gating to identify subpopulations of interest. An IACS performs high speed imaging of cells, which enables new applications not possible using conventional flow cytometry. The IACS combines high throughput of flow cytometry with high-content information of microscopy. The IACS sorts subpopulations of cells to isolate/purify those populations for downstream assays. Cell sorting occurs in less than 500 microseconds.

Some Embodiments of Classification Workflow for Flexible Image Based Particle Sorting 1. A method comprising:
    pre-training a feature encoder using cell images;
    performing unsupervised clustering to identify populations, wherein the unsupervised clustering receives output from pre-training the feature encoder;
    implementing a classifier to fine-tune supervised classification; and
    performing real-time classification of cells during active sorting using the classifier.

2. The method of clause 1 wherein the feature encoder detects and measures feature values from the cell images.

3. The method of clause 1 wherein the feature encoder is implemented using a neural network.

4. The method of clause 1 wherein the feature encoder is scalable to accommodate 1 to 12 image channels.

5. The method of clause 1 wherein performing the unsupervised clustering includes classifying cells of the cell images into clusters.

6. The method of clause 1 further comprising manually or automatically determining which population of cells to sort based on results of the unsupervised clustering.

7. The method of clause 5 wherein a user labels the clusters after the unsupervised clustering based on viewing the cluster and representative information, wherein clusters are labeled as "sort" or "do not sort."

8. The method of clause 1 wherein classifier results from the unsupervised clustering are used by the classifier to fine-tune a convolutional neural network.

9. The method of clause 1 wherein the classifier is configured to be re-trained for each experiment.

10. An apparatus comprising:
a non-transitory memory for storing an application, the application for:
pre-training a feature encoder using cell images;
performing unsupervised clustering to identify populations, wherein the unsupervised clustering receives output from pre-training the feature encoder;
implementing a classifier to fine-tune supervised classification; and
performing real-time classification of cells during active sorting using the classifier; and
a processor coupled to the memory, the processor configured for processing the application.

11. The apparatus of clause 10 wherein the feature encoder detects and measures feature values from the cell images.

12. The apparatus of clause 10 wherein the feature encoder is implemented using a neural network.

13. The apparatus of clause 10 wherein the feature encoder is scalable to accommodate 1 to 12 image channels.

14. The apparatus of clause 10 wherein performing the unsupervised clustering includes classifying cells of the cell images into clusters.

15. The apparatus of clause 10 further automatically determining which population of cells to sort based on results of the unsupervised clustering.

16. The apparatus of clause 15 wherein a user labels the clusters after the unsupervised clustering based on viewing the cluster and representative information, wherein clusters are labeled as "sort" or "do not sort."

17. The apparatus of clause 10 wherein classifier results from the unsupervised clustering are used by the classifier to fine-tune a convolutional neural network.

18. The apparatus of clause 10 wherein the classifier is configured to be re-trained for each experiment.

19. A system comprising:
a first device configured for acquiring cell images; and
a second device configured for:
pre-training a feature encoder using the cell images;
performing unsupervised clustering to identify populations, wherein the unsupervised clustering receives output from pre-training the feature encoder;
implementing a classifier to fine-tune supervised classification; and
performing real-time classification of cells during active sorting using the classifier.

20. The system of clause 19 wherein the feature encoder detects and measures feature values from the cell images.

21. The system of clause 19 wherein the feature encoder is implemented using a neural network.

22. The system of clause 19 wherein the feature encoder is scalable to accommodate 1 to 12 image channels.

23. The system of clause 19 wherein performing the unsupervised clustering includes classifying cells of the cell images into clusters.

24. The system of clause 19 further comprising manually or automatically determining which population of cells to sort based on results of the unsupervised clustering.

25. The system of clause 23 wherein a user labels the clusters after the unsupervised clustering based on viewing the cluster and representative information, wherein clusters are labeled as "sort" or "do not sort."

26. The system of clause 19 wherein classifier results from the unsupervised clustering are used by the classifier to fine-tune a convolutional neural network.

27. The system of clause 19 wherein the classifier is configured to be re-trained for each experiment.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method comprising:
pre-training a feature encoder using cell images;
performing unsupervised clustering to identify populations, wherein the unsupervised clustering receives output from pre-training the feature encoder, wherein performing the unsupervised clustering includes classifying cells of the cell images into clusters, wherein a user labels the clusters after the unsupervised clustering based on viewing the cluster and representative information, wherein clusters are labeled as "sort" or "do not sort;"
implementing a classifier to fine-tune supervised classification; and
performing real-time classification of cells during active sorting using the classifier, wherein the real-time classification processes an entire image of each cell.

2. The method of claim 1 wherein the feature encoder detects and measures feature values from the cell images.

3. The method of claim 1 wherein the feature encoder is implemented using a neural network.

4. The method of claim 1 wherein the feature encoder is scalable to accommodate 1 to 12 image channels.

5. The method of claim 1 further comprising manually or automatically determining which population of cells to sort based on results of the unsupervised clustering.

6. The method of claim 1 wherein classifier results from the unsupervised clustering are used by the classifier to fine-tune a convolutional neural network.

7. The method of claim 1 wherein the classifier is configured to be re-trained for each experiment.

8. An apparatus comprising:
a non-transitory memory for storing an application, the application for:
pre-training a feature encoder using cell images;
performing unsupervised clustering to identify populations, wherein the unsupervised clustering receives output from pre-training the feature encoder, wherein performing the unsupervised clustering includes classifying cells of the cell images into clusters, wherein a user labels the clusters after the unsupervised clustering based on viewing the cluster and representative information, wherein clusters are labeled as "sort" or "do not sort;"
implementing a classifier to fine-tune supervised classification; and
performing real-time classification of cells during active sorting using the classifier, wherein the real-time classification processes an entire image of each cell; and
a processor coupled to the memory, the processor configured for processing the application.

9. The apparatus of claim 8 wherein the feature encoder detects and measures feature values from the cell images.

10. The apparatus of claim 8 wherein the feature encoder is implemented using a neural network.

11. The apparatus of claim 8 wherein the feature encoder is scalable to accommodate 1 to 12 image channels.

12. The apparatus of claim 8 further automatically determining which population of cells to sort based on results of the unsupervised clustering.

13. The apparatus of claim 8 wherein classifier results from the unsupervised clustering are used by the classifier to fine-tune a convolutional neural network.

14. The apparatus of claim 8 wherein the classifier is configured to be re-trained for each experiment.

15. A system comprising:
a first device configured for acquiring cell images; and
a second device configured for:
pre-training a feature encoder using the cell images;
performing unsupervised clustering to identify populations, wherein the unsupervised clustering receives output from pre-training the feature encoder, wherein performing the unsupervised clustering includes classifying cells of the cell images into clusters, wherein a user labels the clusters after the unsupervised clustering based on viewing the cluster and representative information, wherein clusters are labeled as "sort" or "do not sort;"
implementing a classifier to fine-tune supervised classification; and
performing real-time classification of cells during active sorting using the classifier, wherein the real-time classification processes an entire image of each cell.

16. The system of claim 15 wherein the feature encoder detects and measures feature values from the cell images.

17. The system of claim 15 wherein the feature encoder is implemented using a neural network.

18. The system of claim 15 wherein the feature encoder is scalable to accommodate 1 to 12 image channels.

19. The system of claim 15 further comprising manually or automatically determining which population of cells to sort based on results of the unsupervised clustering.

20. The system of claim 15 wherein classifier results from the unsupervised clustering are used by the classifier to fine-tune a convolutional neural network.

21. The system of claim 15 wherein the classifier is configured to be re-trained for each experiment.

\* \* \* \* \*